(12) United States Patent
Dorea et al.

(10) Patent No.: US 11,937,580 B2
(45) Date of Patent: Mar. 26, 2024

(54) COMPUTER VISION-BASED FEEDING MONITORING AND METHOD THEREFOR

(71) Applicant: Wisconsin Alumni Research Foundation, Madison, WI (US)

(72) Inventors: Joao Reboucas Dorea, Madison, WI (US); Sek Cheong, Madison, WI (US); Guilherme Jordao de Magalhaes Rosa, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 312 days.

(21) Appl. No.: 17/428,230

(22) PCT Filed: Feb. 5, 2020

(86) PCT No.: PCT/US2020/016804
§ 371 (c)(1),
(2) Date: Aug. 3, 2021

(87) PCT Pub. No.: WO2020/163484
PCT Pub. Date: Aug. 13, 2020

(65) Prior Publication Data
US 2022/0287276 A1   Sep. 15, 2022

Related U.S. Application Data

(60) Provisional application No. 62/801,439, filed on Feb. 5, 2019.

(51) Int. Cl.
*A01K 29/00*   (2006.01)
*A01K 5/01*   (2006.01)
(Continued)

(52) U.S. Cl.
CPC .............. *A01K 29/005* (2013.01); *A01K 5/01* (2013.01); *G06Q 50/02* (2013.01); *G06T 7/70* (2017.01);
(Continued)

(58) Field of Classification Search
None
See application file for complete search history.

(56) References Cited

U.S. PATENT DOCUMENTS

| 2018/0350010 A1 | 12/2018 | Kuper et al. |
| 2019/0008124 A1 | 1/2019 | Komatsu et al. |
| 2020/0125849 A1* | 4/2020 | Labrecque ........... G06Q 10/087 |

FOREIGN PATENT DOCUMENTS

| EP | 2124528 A1 | 12/2009 |
| EP | 2129214 A1 | 12/2009 |

(Continued)

OTHER PUBLICATIONS

ISA/EPO The Hague, PCT/US2020016804, extended European Search Report (EESR) dated Sep. 23, 2022, Lorenz Steinbock (9 pages).

(Continued)

*Primary Examiner* — K. Wong
(74) *Attorney, Agent, or Firm* — Crawford Maunu PLLC

(57) ABSTRACT

Aspects of this disclosure are directed to methods and apparatuses involving the characterization of livestock feeding functions. As may be implemented as or with one or more embodiments herein, networked cameras are configured to capture images of a livestock feed area and machine-vision logic circuitry characterizes, based on the captured images, an amount of available feed and the presence of livestock in the livestock feed area depicted in the captured image over time. Feed-control logic circuitry may assign time-based condition values each respective feed area char- (Continued)

acterized by the cameras based on the characterized amount of available feed and the characterized presence of livestock provided via the machine-vision logic circuitry. An instruction characterizing the presentation of feed in the feed area may be output based on the assigned time-based condition values and a current time. Such an output may be used to control the presentation amount, timing and/or other feeding characteristics.

20 Claims, 5 Drawing Sheets

(51) Int. Cl.
  *G06Q 50/02*    (2012.01)
  *G06T 7/70*    (2017.01)
  *G06V 10/82*    (2022.01)
  *G06V 20/52*    (2022.01)
  *G06V 40/10*    (2022.01)
  *H04N 7/18*    (2006.01)

(52) U.S. Cl.
  CPC .............. *G06V 10/82* (2022.01); *G06V 20/52* (2022.01); *G06V 40/10* (2022.01); *H04N 7/181* (2013.01); *G06T 2207/20081* (2013.01); *G06T 2207/20084* (2013.01); *G06T 2207/30232* (2013.01); *G06T 2207/30242* (2013.01)

(56) References Cited

FOREIGN PATENT DOCUMENTS

| | | |
|---|---|---|
| EP | 2838356 A1 | 2/2015 |
| EP | 2983465 A1 | 2/2016 |
| EP | 3316680 A1 | 5/2018 |
| JP | 2012205555 A | 10/2012 |
| KR | 1020140110739 A | 9/2014 |
| KR | 1020160005456 A | 1/2016 |
| KR | 101867672 B1 | 6/2018 |
| WO | WO-2014083433 A2 * | 6/2014 .............. A01J 5/007 |
| WO | 2015096345 A1 | 7/2015 |
| WO | 2018/038602 A1 | 3/2018 |

OTHER PUBLICATIONS

KR/ISR, PCT/US20/16804, PCT Search Report and Written Opinion dated Jun. 5, 2020, International Application Division Korean Intellectual Property Office (16 pgs).

* cited by examiner

COMPUTER VISION-BASED FEEDING MONITORING AND METHOD THEREFOR

OVERVIEW

Aspects of the present disclosure are directed to computer vision-based feed monitoring. Certain aspects are directed to monitoring feed delivery and related animal behavior, and for managing feeding for the same.

Various aspects are directed to addressing challenges to one or more of the design, manufacture and resulting structure/implementation of feed troughs, controlling animal feeding, and ascertaining characteristics of the same. Certain aspects are directed to addressing challenges presented by weather, animal behavior and staff fluctuation, which can affect automated monitoring and related implementations. For instance, improper feeding of cattle can hinder mink production and growth. In some instances, lack of available feed can cause stress to animals, which can be exasperated over time. Further, monitoring large livestock operations in an accurate and efficient manner, particularly where such operations are in remote areas and/or otherwise do not have the resources to adequately monitor the livestock.

These and other matters have presented challenges to the implementation and management of feed troughs, for a variety of livestock and other applications.

Various example embodiments are directed articles of manufacture, related apparatuses and methods, which may address various challenges including those noted above.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
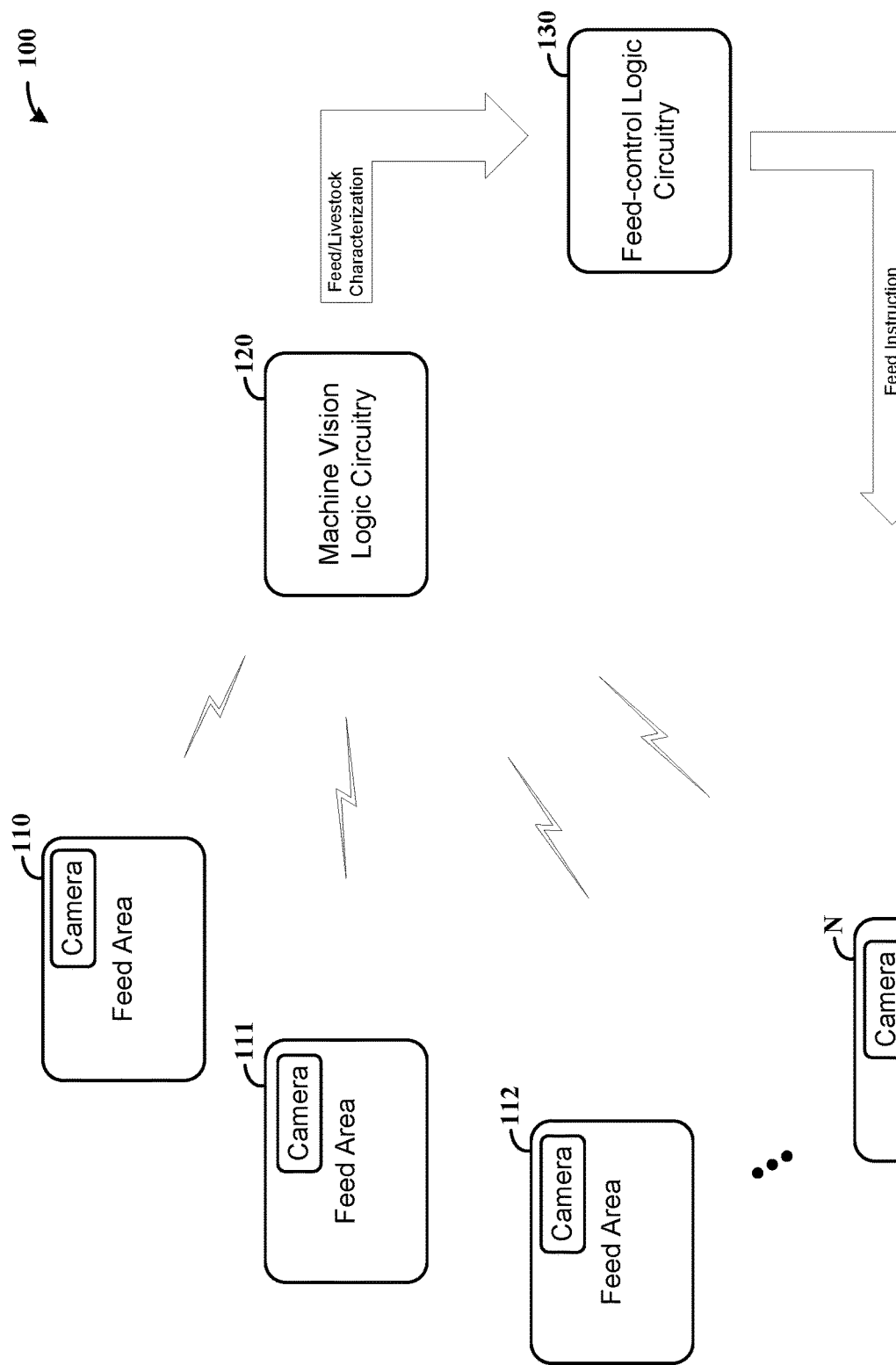
FIG. 1 shows an apparatus/system involving feed monitoring and methods therefor, as may be implemented in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of apparatuses, systems and methods involving feed troughs and related monitoring and control, as well as overall livestock feeding applications. Various aspects of the present disclosure have been shown to be beneficial when used in the context of utilizing machine vision for monitoring feed troughs, and related approaches for correlating the detected presence of animals and amount of available feed for generating and outputting a feeding schedule.

In accordance with a particular embodiment, a computer vision system includes a plurality of cameras configured and located to capture feed bunk and livestock images. The cameras may be located at different locations in feedlots or other agricultural environments. These images are processed through image analysis algorithms, and utilized in conjunction with one another to generate an output useful in controlling one or more aspects of livestock management, such as related machinery and componentry. In certain specific embodiments, an amount of feed in a feed bunk as well as a number of livestock at the bunks are assessed relative to time. Results of the assessment relative to amount and/or leftover feed and the number of livestock at respective times are utilized to characterize aspects of the feeding environment. For instance, the amount of feed and livestock present in an agricultural environment at respective times can be utilized to determine conditions under which more feed is needed and/or when too much feed is present. This data can also be automatically utilized to generate a call for additional feed, or to generate an output indicating a condition when too much feed has been presented. This data can further be utilized to generate a predictive feeding schedule, based on time of day and predicted feeding needs. This data may also be utilized to characterize animal starvation status, by combining the feeding behavior and bunk management predictions.

Various other environmental conditions can be monitored and used with feed amount and livestock presence, such as noted above. For instance, in some embodiments one or more of actual or forecast precipitation, temperature, wind, humidity, barometric pressure, and amount of sun (or clouds) can be ascertained and utilized in generating outputs indicative of a feeding need, or in generating a predictive output in regard to the same.

Outputs generated based on the monitoring and machine vision can be tailored to suit particular applications. In some embodiments, an output is generated to instruct an amount of feed to be delivered to one or more bunks to maximize feedstock gain or milk yield while minimizing feed waste. This output can be dynamically generated based on monitored characteristics as noted herein, based on livestock behavior and/or environmental conditions.

Certain embodiments are directed to tracking characteristics of feed delivery, such as quantity, time, and an amount of time an employee or machine performs a specific task. For instance, objects may be identified via machine vision, and characteristics of feed delivery as related to the presence of the objects can be tracked relative to time and utilized with data characterizing feed amount and livestock presence.

A variety of power sources may be utilized for powering machine vision and/or processing techniques implemented herein, to suit particular embodiments. In some embodiments electricity is provided through an electric wire, by solar panels, or induction.

Results of machine vision and related processing can be processed or otherwise provided in a variety of manners. In some embodiments, images are processed at or near a location at which they are obtained, for ascertaining feed amount and livestock presence, or a variety of other imaged aspects as characterized herein. Such processing may further involve ascertaining aspects of delivering feed. In other embodiments, images are transmitted to a remote location (e.g., to cloud computing circuitry) where the images are processed (e.g., algorithms are run), which transmits results for use in controlling the provision of feed to the monitored livestock and related feed trough. The resulting instructions/output can be provided in a number of manners, such as through a dashboard, on computers, tablets or smartphones.

It has been recognized/discovered that, using aspects as noted herein with behavior of the livestock, an association, relationship or correlation between the behavior and feed presence and amount can be made and utilized to generate and output enhanced data that can be used in managing the delivery of feed. Various such associations, relationships and/or correlations may be made in this manner, with certain embodiments directed to such correlation being further discussed herein.

In some implementations, machine vision is utilized for ascertaining an amount of feed in a bunk as well as a number of animals within an area at the bunk. The ascertained amount of feed is categorized into predetermined ranges of feed amounts, and the ascertained number of animals is also categorized into predetermined ranges of numbers of animals. Such ranges may include, for example, amounts of feed corresponding to full, medium, low and empty states of the bunk. For the animals, such ranges may include numbers of animals corresponding to empty, low, half, and full area around the bunk. The images can be processed in real time and utilized to generate outputs based on a combination of the respective states. For instance, an empty bunk and empty area (of animals), or a full bunk with a full area of animals may correspond to a "green flag" condition. In a first scenario, although the feed bunk is empty, animals may not hungry or not anxiously waiting for feed to be delivered. In another scenario, animals are feeding and there is plenty of feed available. However, a half full amount of animals around the feed bunk and an empty bunk may correspond to a "red flag", condition indicative of a need for feed in the bunk, which may be communicated via an automatically-generated warning output.

In various embodiments, animal feeding patterns are predicted based upon the respective states noted above, relative to time. Such patterns may also relate to when and how the feed is made available, or can be dictated based on desired feeding times. For instance, where a feeding pattern is indicative of a total amount of feed that may be consumed at a particular given time, the amount and timing of feeding can be tailored accordingly. Weather conditions and weather forecasts can also be utilized as noted above, for example to avoid having feed present while precipitation is occurring (or delivery of feed if strong rain is expected to come), helping to limit the amount of feed exposed to precipitations, which may facilitate the mitigation of spoilage.

In various embodiments, a feed bunk management system includes a network of interconnected data collection stations. A central station, such as may involve a computer server, is also connected to the data collection stations. This connection may, for example, involve an internet protocol connection, cellular connection or other data connection. An internet protocol connection may be made using a POE (Power Over Ethernet) connection that also provides power. Each data collection station includes a camera and logic circuitry, such as a NUC (Next Unit of Computing) computer. The camera captures images of a feed bunk and the NUC performs preliminary data processing and stores the data temporarily until the data is uploaded to the central station (server and/or cloud).

The cameras and NUCs may be powered either through electric wires, if available at the feedlot, or through solar panels. Such solar panels may be paired with batteries for storage of energy for the system to be able to continue working during nights and when sunlight is not available, due to weather conditions. Batteries can be installed on feedlots with electric energy, as a backup system when power is lost.

As may be implemented in accordance with one or more embodiments, an apparatus includes a plurality of networked cameras, machine-vision logic circuitry and feed-control logic circuitry. Each camera is configured and arranged to capture images of a livestock feed area. The machine-vision logic circuitry is configured and arranged to, for each of the captured images, characterize an amount of available feed in the livestock feed area depicted in the captured image over time, and characterize the presence of livestock in the livestock feed area depicted in the captured image over time. The feed-control logic circuitry is configured and arranged to, for each respective feed area characterized by the plurality of networked cameras, assign time-based condition values based on the characterized amount of available feed and the characterized presence of livestock provided via the machine-vision logic circuitry, and output an instruction characterizing the presentation of feed in the feed area based on the assigned time-based condition values and a current time.

The feed-control logic circuitry can be implemented in a variety of manners. In some embodiments, the feed-control logic circuitry is configured and arranged to assign the time-based condition values based on a number of livestock present over time during which the characterized amount of available feed is below a threshold level. Variables may be utilized, such as by assigning the time-based condition values using a score assigned to respective variables representing a level of feed available in the feed area and the number of livestock in the feed area at a common time. The scored variables are processed in an algorithm that utilizes the scored variables as inputs for providing a notification that feed is needed in the feed area, which is generated as the output. The feed-control logic circuitry may be used to predict future feeding needs of the livestock in each livestock feed area based on the assigned time-based condition values, and output an instruction directing the provision of feed in the feed area at a future time, based on the predicted future feeding needs. For instance, the feed-control logic circuitry may operate with the machine-vision logic circuitry to assign the time-based condition values based on the characterized presence of livestock under conditions when the characterized amount of available feed is below a threshold, and to predict future feeding needs of the livestock in each livestock feed area based on the assigned time-based condition values. The feed-control logic circuitry may further operate with the machine-vision logic circuitry to assign the time-based condition values based on the characterized presence of livestock relative to one or more threshold amounts of the characterized amount of available feed, and to predict future feeding needs of the livestock in each livestock feed area based on the assigned time-based condition values. Weather conditions may also be utilized by the feed-control logic circuitry to output an instruction characterizing the presentation of the feed for each respective feed area based on current or predicted weather-based variables applicable to the feed area.

In another embodiment, the feed-control logic circuitry triggers a prediction task for captured images in each feed area, and implements a deep learning algorithm to generate predicted classes based on a model trained using transfer-learning strategies. The predicted classes and respective probabilities are stored with timestamp and location data. Feeding needs for an upcoming feeding period for the livestock are predicted based on the assigned time-based condition values, the predicted classes, weather forecast data, and animal behavior characteristics linked to the feed area.

In certain implementations, the machine-vision logic circuitry determines the animal behavior characteristics in the feed area based on one or more of animal movement and animal presence. For instance, restless animals may move around more than calm animals, or animals may feed less when nervous. Animals may also move faster or slower than an expected rate of movement, based on a variety of characteristics ranging from nervous conditions to other health conditions.

The machine-vision logic circuitry may also be utilized in a variety of manners. In some implementations, the machine-vision logic circuitry characterizes an amount of available feed by detecting a level of feed available in a feed container accessible by the livestock for feeing, and characterizes the presence of livestock in the livestock feed area by characterizing a number of livestock present at the feed container. The feed-control logic circuitry then assigns the time-based condition values by assigning a score to respective variables representing the level of feed and the number of livestock for one or more points in time, and outputs the instruction by providing a notification in response to the assigned scores of the variables satisfying a condition.

In certain embodiments, different ones of the networked cameras are located at respective ones of the livestock feed areas. The machine-vision logic circuitry includes respective logic circuits located at each of the livestock feed areas, each logic circuit being configured to process images captured by the networked camera at its corresponding livestock feed areas to provide the characterization of the amount of available feed and the presence of livestock. An output representing the respective characterizations are transmitted to the feed-control logic circuitry.

An amount of feed may be estimated in a variety of manners. In some embodiments, each of a plurality of networked cameras is configured to capture an image of a livestock feed area by capturing a portion of the livestock feed area that is less than all of the livestock feed area. The machine-vision logic circuitry is then configured to characterize the amount of available feed and the presence of the livestock by estimating a total amount of feed and a total number of livestock in the entire livestock feed area, based on the image of the portion of the livestock feed area.

Weather data may be used to augment data concerning feed amount and livestock presence as ascertained via machine vision or otherwise, in accordance with the various embodiments herein. In a particular embodiment, the aforementioned feed-control logic circuitry is configured to operate with the machine-vision logic circuitry to utilize a data-mining algorithm with the characterized amount of available feed, the characterized presence of livestock, and weather data as inputs to the algorithm. This algorithm and these inputs are used predict an amount of feed needed, and to output an instruction based on the predicted amount of feed.

A variety of algorithm type approaches can be implemented for assessing and implementing predictive approaches to controlling an amount of feed and adjusted based on learning algorithms and actual observed feed and livestock amounts. In some embodiments, feed-control logic circuitry is operates to generate an algorithm model for predicting feed levels and cattle presence based on a plurality of the images of the livestock feed area, the characterized amount of available feed and the characterized presence of livestock. In response to a new captured image of the livestock feed area, the amount of available feed and the presence of livestock depicted in the captured image are characterized and used by the algorithm model together with the amount of available feed and presence of livestock as inputs, to generate a predictive output. Such an output may indicate characteristics at which one or more of an insufficient amount of feed will be present as defined for a threshold level of livestock and an excess amount of feed is/will be present as defined for the threshold level of livestock.

Networked cameras as characterized herein may be implemented in one or more of a variety of manners. In some implementations, each camera is an autonomous unit and does not rely on an internet connection or network signal, and may otherwise communicate with logic/processing circuitry for assessing feed/livestock. Each camera or camera unit may have a computer, such as a small single-board computer with storage, a broadband cellular network or other communication link, solar panel and battery. Each camera or camera unit may also have a Wi-Fi connection, which may be implemented for example in environments in which no cellular network is present and/or in which Wi-Fi is preferred. A local server may be installed in a local environment involving the networked cameras, and may distribute internet through a radio signal. Such cameras/camera units may operate in parallel and autonomously. In the absence of an Internet or other network connection, images may be temporarily stored on a single board computer as noted above, and uploaded later to cloud or other storage when an Internet or other network connection is re-established. Such images may be uploaded in batches.

In certain embodiments, a deep-learning algorithm may be used to perform instance segmentation in parallel with the tasks associated with identification and localization. This approach may be divided into three phases. First, a backbone network (with a deep learning algorithm) may extract feature maps from input images. Second, feature maps generated from the backbone deep learning algorithm may be sent to the region proposal network (RPN) to produce regions of interest (ROIs). Third, the ROIs generated by the RPN are mapped to extract corresponding target features in the shared feature maps and subsequently output to fully connected layers (FC) and a fully convolutional network (FCN), which may be used to classify targets and segment instances, respectively. Such an approach may be carried out using a Mask-RCNN type algorithm as denoted in He, K., Gkioxari, G., Dollar, P. and Girshick, R. Mask RCNN, In Proceedings of the IEEE International Conference on Computer Vision, Venice—Italy, 2980-2988, 2017, which is fully incorporated herein by reference. In certain embodiments, such an approach may be carried out with the first, second and third phases respectively implemented in accordance with FIGS. 3, 4 and 5 as characterized below.

Turning now to the figures, FIG. 1 shows an apparatus 100 (or system), as may be implemented in accordance with one or more embodiments. The apparatus 100 includes a plurality of cameras respectively located within feed areas 110, 111, and 112-N (and further feed areas). These cameras communicate with machine vision logic circuitry 120, which operates to assess images ascertained via the cameras to characterize an amount of feed and animals in each respective one of the feed areas and provide an output indicative of the same. This approach may involve, for example, imaging a feed trough and a predefined area around the feed trough, and ascertaining an amount of feed in the trough as well as a number of animals around the feed trough. Feed-control logic circuitry 130 utilizes the feed/livestock characterization to generate a feed instruction, for example by indicating whether feed is needed at a current time, or by generating a feed schedule based upon monitoring. Generating a feed schedule may, for example, involve predicting a feed schedule or otherwise providing an output as noted herein.

The machine vision logic circuitry 120 and feed-control logic circuitry 130 may be implemented in a variety of manners. In some embodiments, the machine vision logic circuitry is implemented with the feed-control logic circuitry in a common circuit. In certain embodiments, the machine vision logic circuitry is implemented as separate circuits within and/or connected locally (e.g., directly) to each camera in the feed areas 110-N, facilitating the transmission of data characterizing the feed/livestock, which may be useful for limiting the amount of data transmitted over distance (e.g., without the need for transmitting images that may involve a large amount of data). In other embodiments, the machine vision logic circuitry is located remotely from the cameras/feed areas 110-N, and processes the data from each feed area to provide an output characterizing the feed and/or livestock.

Figure 2:
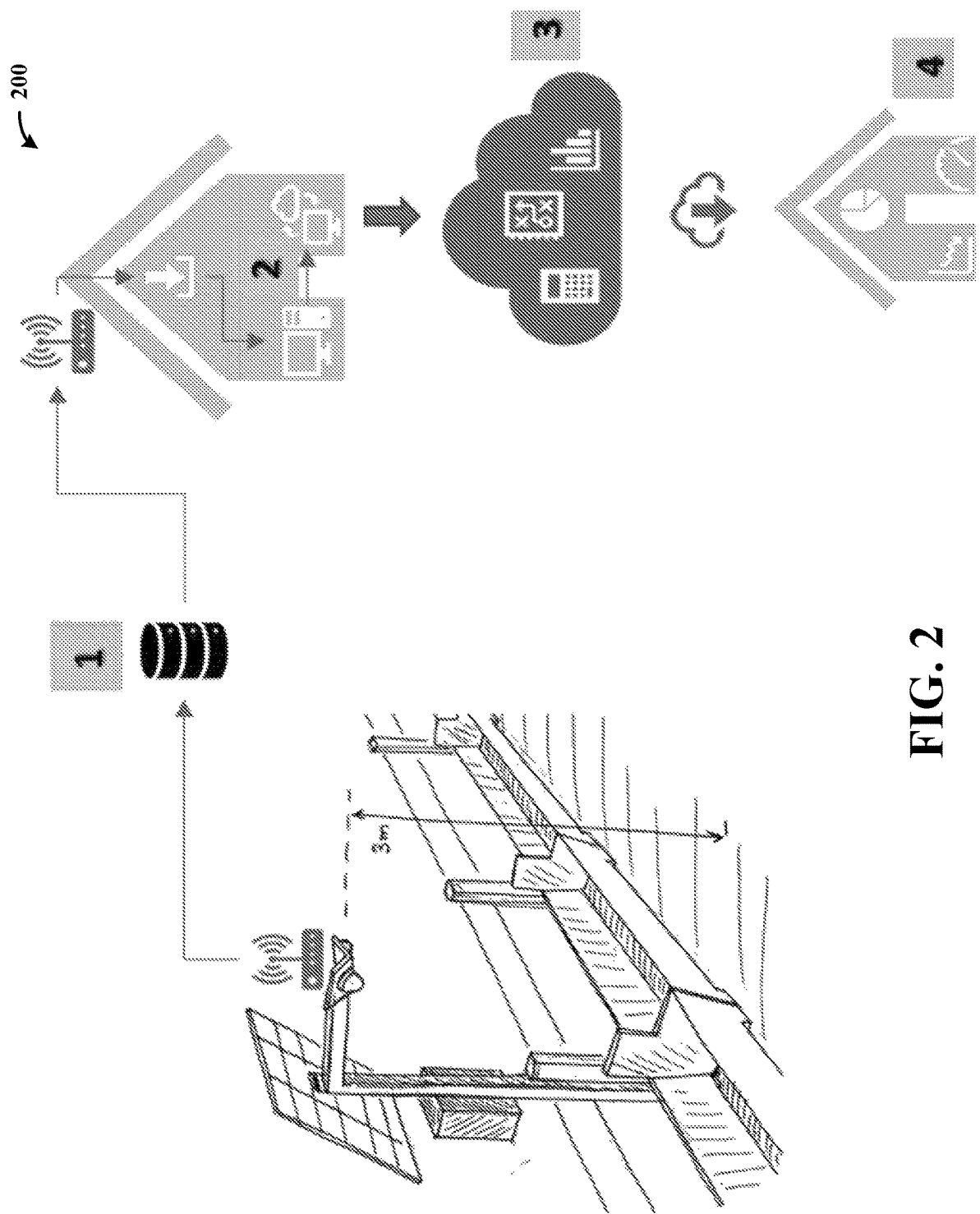
FIG. 2 shows a data flow diagram, as may be implemented in accordance with various embodiments.

FIG. 2 is a data-flow type diagram characterizing an approach and apparatus/system 200 to assessing images via machine vision for determining an amount of feed and livestock present, in accordance with another example embodiment. Data transfer and storage is carried out on a local server (1), and transferred to a cloud platform (2), from which data analyses is performed at (3) and data visualization is provided at (4). In some implementations, the local server (1) is omitted and communications are made directly to the cloud platform (2). In other implementations, one or more aspects shown at 1, 2, 3 and 4 are combined. For instance, preliminary data analysis may take place locally at the feed trough location.

In a particular embodiment involving the apparatus 200, an image is acquired on an interval (e.g., every 15 minutes) by a Wi-Fi camera and is sent through a network to a local server (1), where the image is stored and sent to a cloud platform (2). Each image may have an average size of 700 KB, and include image types such as RGB, depth and infrared. If Internet is available, data may be transferred automatically from the local server (1) to the cloud platform (2) in real-time. If Internet is temporarily unavailable, data is stored locally at (1) and sent to the cloud at (2) when an Internet connection is re-established. In the cloud at (2), images are stored, such as by using Blob storage (Binary Large Objects).

Processing of the image data can be carried out in a variety of manners, to suit particular applications. In some embodiments, each new image arriving on the Blob storage triggers a function that calls an algorithm to generate predictions on the respective image. Thousands of images may be labeled for bunk score classes to characterize a level of feed and livestock presence. For instance, levels corresponding to empty, low, medium, and full, and livestock presence corresponding to empty, low, half, and full may be utilized for labeling images.

After a desired amount of images are labeled, the images can be used for predicting feed levels and cattle presence. For instance, a Convolutional Neural Network (CNN) can be trained in order to generate accurate predictions. After model assessment (in terms of prediction quality), an algorithm corresponding to the trained model can be stored in the cloud. Thus, for every new image coming to the cloud, the algorithm can be called and a prediction is made. The result of the prediction (e.g., prediction and its associate probability, as a measure of uncertainty), date, time, and unique identifier can be saved (e.g., in another Blob storage). Results of the predictions can then be downloaded to a local server where they can be visualized in a dashboard.

Figure 3:
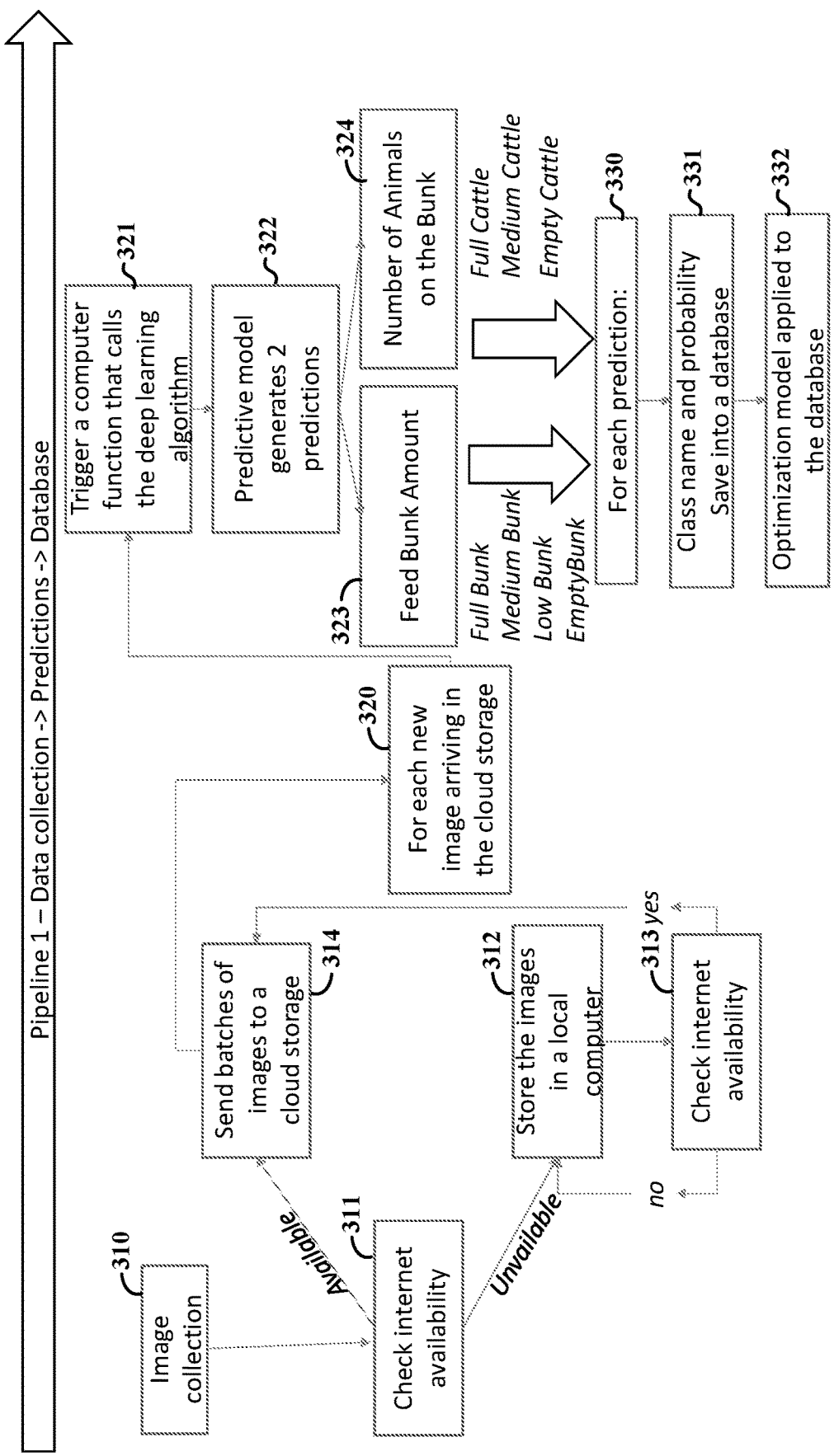
FIG. 3 shows a data flow diagram involving imaging for characterization of feed bunk amount and animal presence, as may be implemented in accordance with various embodiments.

FIG. 3 shows a data flow diagram involving imaging for characterization of feed bunk amount and animal presence, as may be implemented in accordance with various embodiments. Images are collected at block 310, and internet (or other network) availability is checked at block 311. If the internet is unavailable, images are stored in a local computer (or other memory) at 312, and internet availability is checked again (e.g., iteratively) at 313. If the internet is available at 313 or at 311, batches of images are sent to cloud storage at 314.

At block 320, a process is initiated for each new image arriving and proceeds by trigging a function that calls a deep learning algorithm at block 321. At block 322, a predictive model generates and outputs predictions for a feed bunk amount 323 and number of animals at the bunk 324, for each respective image (or, e.g., for a few images taken closely in time). These predictions may include, for example, four feed bunk levels as shown (full, medium, low, empty) and three animal levels as shown (full, medium and empty).

Processing is initiated at block 330 for each prediction, with each prediction classified/named and being assigned a probability at block 331, with the information being stored. At block 332, an optimization model is applied to the database and used to determine a feed amount.

Figure 4:
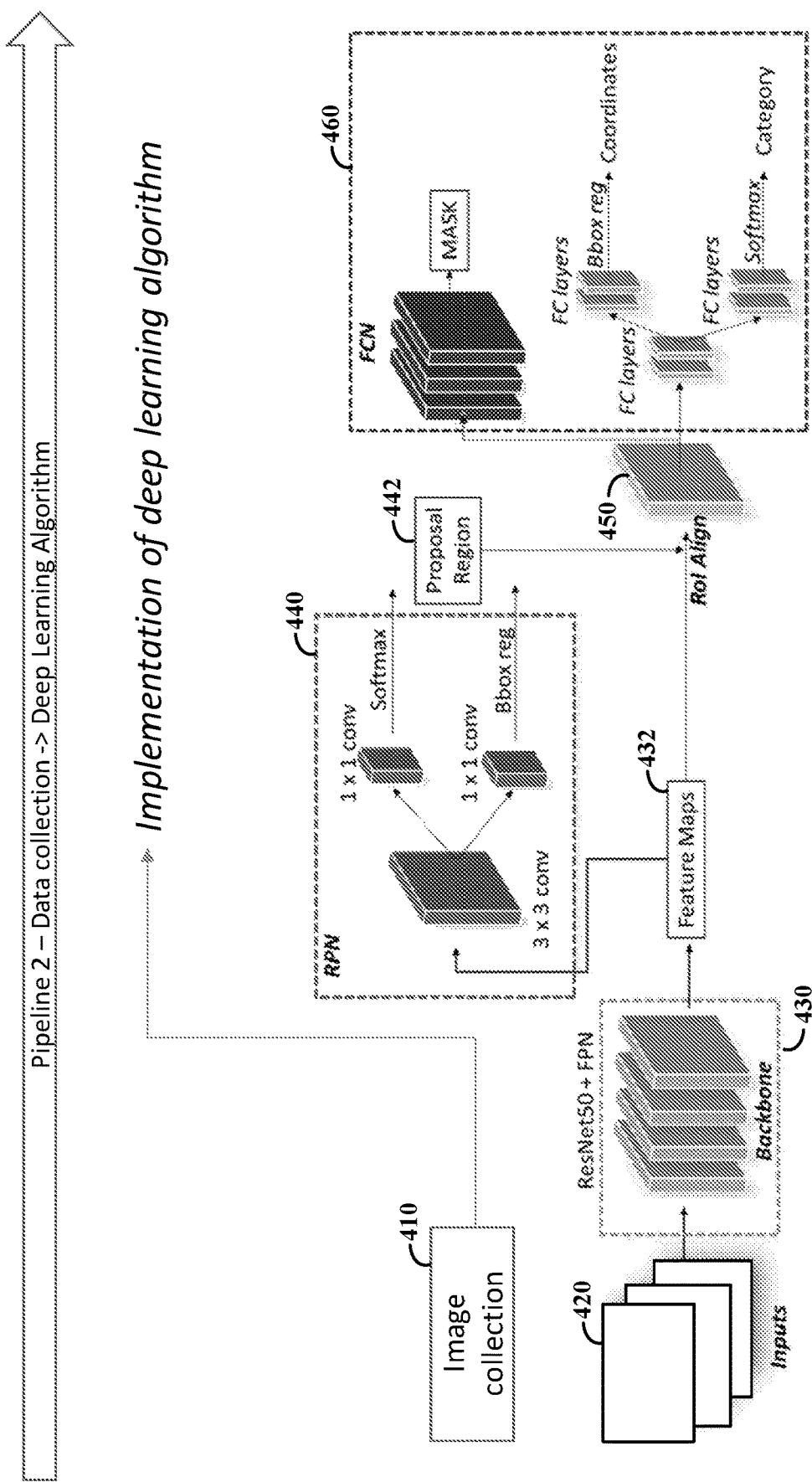
FIG. 4 shows a data flow diagram involving data collection and learning, such as may be implemented with the learning algorithm block in FIG. 3 and/or otherwise in accordance with various embodiments.

FIG. 4 shows a data flow diagram involving data collection and learning, such as may be implemented with the learning algorithm block 321 in FIG. 3 and/or otherwise in accordance with various embodiments. Image collection is shown at block 410, and the images are used for implementing a deep learning algorithm. This may be carried out, for example, by collecting images as inputs at 420, with a backbone-learning network 430 processing the images to generate feature maps 432. The feature maps may be processed in a region proposal network 440, which produces regions of interest at block 442 that can be combined with the feature maps at 450. These regions of interest can thus be mapped to extract corresponding target features in the shared feature maps and, at used at 460 to generate coordinates and categories with fully connected layers (FC), and a mask with a fully convolutional network (FCN) that may be used to classify targets and segment instances, respectively. Such an approach may be carried out using a Mask-RCNN type algorithm as referenced above.

Figure 5:
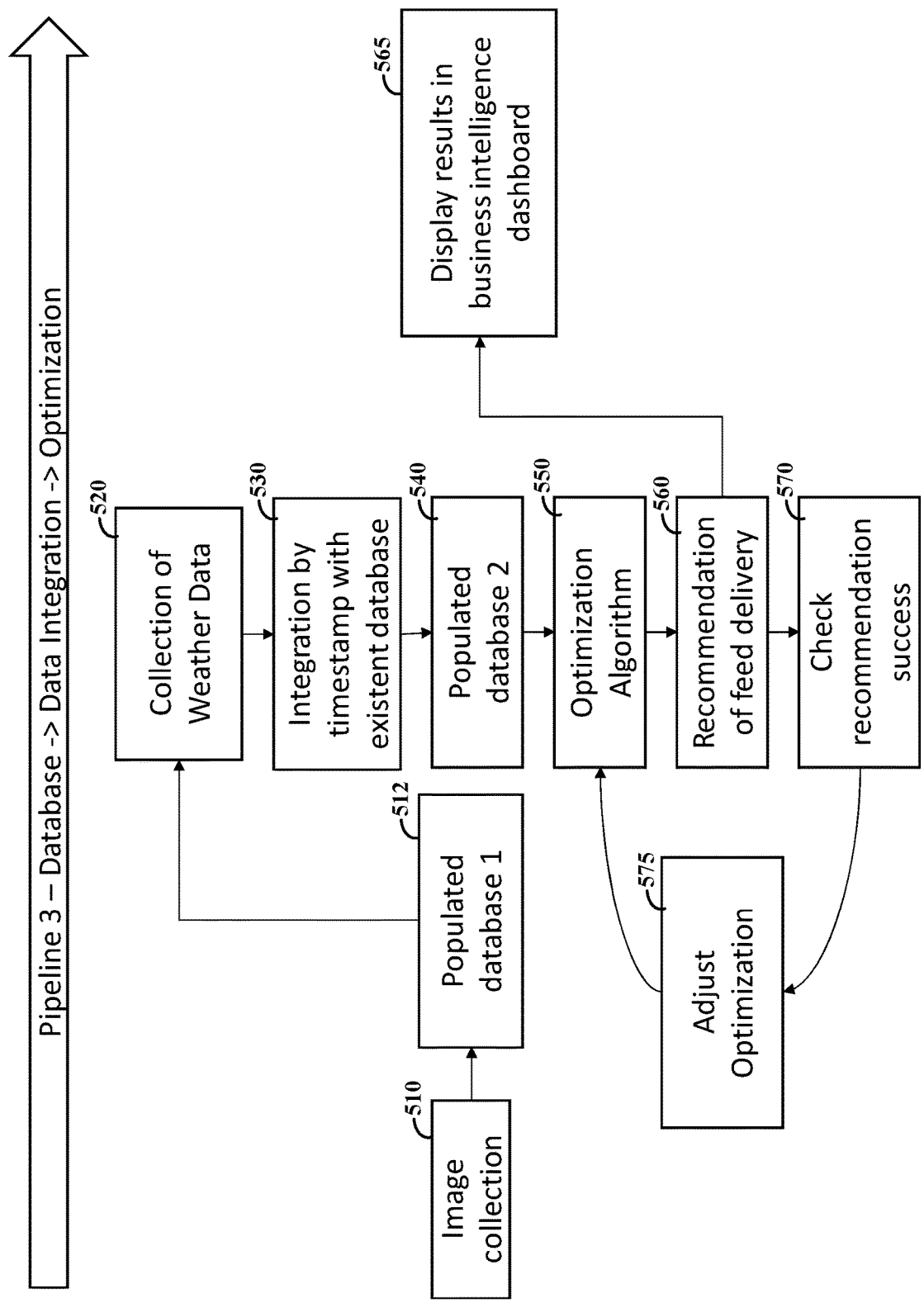
FIG. 5 shows a data flow diagram involving data integration and generation of feed delivery recommendation, such as may be implemented with the optimization block in FIG. 3 and/or otherwise in accordance with various embodiments.

FIG. 5 shows a data flow diagram involving data integration and generation of feed delivery recommendation, such as may be implemented with the optimization block 332 in FIG. 3 and/or otherwise in accordance with various embodiments. At block 510, images are collected and used at block 512 to populate a database. Weather data is collected at block 520, integrated with the collected images at block 530, and used to populate a database at 540. An optimization algorithm 550 is initiated at block 550 and used to generate a recommended feed delivery at 560, based on the collected image and weather data. Results may be displayed at block 565. Success of the recommendation may be checked at block 570, such as by assessing an actual implementation of a recommended amount of feed that is delivered (e.g., is it enough, too little, or did it get too wet, etc.). The optimization may be adjusted at 575 based on the assessed recommendation(s) from block 570, and used in providing a subsequent feed delivery recommendation at 560.

Various terminology used herein (and in the claims) may be implemented by way of various circuits or circuitry, as may be illustrated by or referred to as a block, module, device, system, unit, controller, model, computer function and/or other circuit-type depictions (e.g., the various blocks/modules depicted in FIGS. 3-5). Such circuits or circuitry are used together with other elements to exemplify how certain embodiments may be carried out in the form or structures, steps, functions, operations, and activities. For example, in certain of the above-discussed embodiments, one or more modules are discrete logic circuits or programmable logic circuits configured for implementing operations/activities, as may be carried out in the approaches shown in the Figures and/or otherwise characterized herein. In certain embodiments, a programmable circuit as may be implemented for one or more blocks is one or more computer circuits, including memory circuitry for storing and accessing a program to be executed as a set (or sets) of instructions (and/or to be used as configuration data to define how the programmable circuit is to perform), and an algorithm or process as described in connection with the channel estimation/decoding approaches, or as described with the figures, is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, a variety of different types of feed troughs and approaches may be monitored, and a variety of different types of animals be monitored. Other factors, such as time of year, number of animals, environmental conditions, may also be utilized as part of a characterization of an overall feeding environment and to provide insight as to how to manage feeding. Various modelling approaches may be utilized to generate specific characterizations based on available data sets and use thereof. Such modifications do not depart from the true spirit and scope of various aspects of the invention, including aspects set forth in the claims.

What is claimed is:

1. An apparatus comprising:
a plurality of networked cameras, each camera configured and arranged to capture images of a livestock feed area;
machine-vision logic circuitry configured and arranged to, for each of the captured images,
characterize an amount of available feed in the livestock feed area depicted in the captured image over time, and
characterize the presence of livestock in the livestock feed area depicted in the captured image over time; and
feed-control logic circuitry configured and arranged to, for each respective feed area characterized by the plurality of networked cameras,
assign time-based condition values to the feed area based on the characterized amount of available feed and the characterized presence of livestock provided via the machine-vision logic circuitry, and
output an instruction characterizing the presentation of feed in the feed area based on the assigned time-based condition values and a current time.

2. The apparatus of claim 1, wherein the feed-control logic circuitry is configured and arranged to assign the time-based condition values based on a number of livestock present over time during which the characterized amount of available feed is below a threshold level.

3. The apparatus of claim 1, wherein
the machine-vision logic circuitry is configured and arranged to
characterize the amount of available feed by detecting a level of feed available in a feed container accessible by the livestock for feeing, and
characterize the presence of livestock in the livestock feed area by characterizing a number of livestock present at the feed container; and
the feed-control logic circuitry is configured and arranged to
assign the time-based condition values by assigning a score to respective variables representing the level of feed and the number of livestock for one or more points in time, and
output the instruction by providing a notification in response to the assigned scores of the variables satisfying a condition.

4. The apparatus of claim 1, wherein the feed-control logic circuitry is configured and arranged to
assign the time-based condition values by assigning a score to respective variables representing a level of feed available in the feed area and the number of livestock in the feed area at a common time, and
output the instruction by processing the scored variables in an algorithm that utilizes the scored variables as inputs for providing a notification that feed is needed in the feed area.

5. The apparatus of claim 1, wherein the feed-control logic circuitry is configured and arranged to:
predict future feeding needs of the livestock in each livestock feed area based on the assigned time-based condition values, and
output the instruction by outputting an instruction directing the provision of feed in the feed area at a future time, based on the predicted future feeding needs.

6. The apparatus of claim 5, wherein the feed-control logic circuitry is configured and arranged with the machine-vision logic circuitry to
assign the time-based condition values based on the characterized presence of livestock under conditions when the characterized amount of available feed is below a threshold, and
predict future feeding needs of the livestock in each livestock feed area based on the assigned time-based condition values.

7. The apparatus of claim 1, wherein the feed-control logic circuitry is configured and arranged with the machine-vision logic circuitry to
- assign the time-based condition values based on the characterized presence of livestock relative to one or more threshold amounts of the characterized amount of available feed, and
- predict future feeding needs of the livestock in each livestock feed area based on the assigned time-based condition values.

8. The apparatus of claim 1, wherein the feed-control logic circuitry is configured and arranged to output the instruction characterizing the presentation of the feed for each respective feed area based on current or predicted weather-based variables applicable to the feed area.

9. The apparatus of claim 1, wherein
- different ones of the plurality of networked cameras are located at respective ones of the livestock feed areas,
- the machine-vision logic circuitry includes respective logic circuits located at each of the livestock feed areas, each logic circuit being configured and arranged to process images captured by the networked camera at its corresponding livestock feed areas to provide the characterization of the amount of available feed and the presence of livestock, and to transmit an output representing the respective characterizations to the feed-control logic circuitry.

10. The apparatus of claim 1, wherein
- each of the plurality of networked cameras is configured and arranged to capture an image of the livestock feed area by capturing a portion of the livestock feed area that is less than all of the livestock feed area; and
- the machine-vision logic circuitry is configured and arranged to characterize the amount of available feed and the presence of the livestock by estimating a total amount of feed and a total number of livestock in the entire livestock feed area, based on the image of the portion of the livestock feed area.

11. The apparatus of claim 1, wherein the feed-control logic circuitry is configured and arranged to:
- generate an algorithm model for predicting feed levels and cattle presence based on a plurality of the images of the livestock feed area, the characterized amount of available feed and the characterized presence of livestock;
- in response to a new captured image of the livestock feed area, characterize the amount of available feed and the presence of livestock depicted in the captured image, execute the algorithm model with the amount of available feed and presence of livestock as inputs, and generate a predictive output indicating characteristics at which one or more of:
  - an insufficient amount of feed will be present as defined for a threshold level of livestock; and
  - an excess amount of feed is present as defined for the threshold level of livestock.

12. The apparatus of claim 1, wherein the feed-control logic circuitry is configured and arranged with the machine-vision logic circuitry to utilize a data mining algorithm with the characterized amount of available feed, the characterized presence of livestock, and weather data as inputs to the algorithm, to predict an amount of feed needed, and to output an instruction based on the predicted amount of feed.

13. The apparatus of claim 1, wherein the feed-control logic circuitry is configured and arranged to, for each feed area:
- trigger a prediction task for the captured images and implement a deep learning algorithm to generate predicted classes based on a model trained using transfer-learning strategies;
- store the predicted classes and respective probabilities with timestamp and location data; and
- predict feeding needs for an upcoming feeding period for the livestock based on the assigned time-based condition values, the predicted classes, weather forecast data, and animal behavior characteristics linked to the feed area.

14. The apparatus of claim 13, wherein the machine-vision logic circuitry is configured and arranged to determine the animal behavior characteristics in the feed area based on one or more of animal movement and animal presence.

15. An apparatus comprising:
- machine-vision logic circuitry configured and arranged to, for images of a livestock feed area captured by a plurality of networked cameras:
  - characterize an amount of available feed in the feed area depicted in the images over time, and
  - characterize the presence of livestock in the feed area depicted in the images over time; and
- feed-control logic circuitry configured and arranged to:
  - assign time-based condition values to the feed area based on the characterized amount of available feed and the characterized presence of livestock provided via the machine-vision logic circuitry, and
  - output an instruction characterizing the feed in the feed area based on the assigned time-based condition values.

16. A method comprising:
- for each captured image of a livestock feed area,
  - characterizing an amount of available feed in the livestock feed area depicted in the captured image over time, and
  - characterizing the presence of livestock in the livestock feed area depicted in the captured image over time; and
- for each respective feed area characterized by each captured image,
  - assigning time-based condition values based on the characterized amount of available feed and the characterized presence of livestock, and
  - outputting an instruction characterizing the presentation of feed in the feed area based on the assigned time-based condition values and a current time.

17. The method of claim 16, further including assigning the time-based condition values based on a number of livestock present over time during which the characterized amount of available feed is below a threshold level.

18. The method of claim 16, wherein:
- characterizing the amount of available feed includes detecting a level of feed available in a feed container accessible by the livestock for feeing;
- characterizing the presence of livestock in the livestock feed area includes characterizing a number of livestock present at the feed container;
- assigning the time-based condition values includes assigning a score to respective variables representing the level of feed and the number of livestock for one or more points in time; and
- outputting the instruction includes providing a notification in response to the assigned scores of the variables satisfying a condition.

19. The method of claim 16, wherein:
assigning the time-based condition values includes assigning a score to respective variables representing a level of feed available in the feed area and the number of livestock in the feed area at a common time; and
outputting the instruction includes processing the scored variables in an algorithm that utilizes the scored variables as inputs for providing a notification that feed is needed in the feed area.

20. The method of claim 16, further including predicting feeding needs of the livestock in each livestock feed area based on the assigned time-based condition values, wherein outputting the instruction includes outputting an instruction directing the provision of feed in the feed area at a future time, based on the predicted future feeding needs.

* * * * *